(12) United States Patent  (10) Patent No.: US 9,276,966 B2
Tenenti et al.  (45) Date of Patent: Mar. 1, 2016

(54) IMS APPLICATION FOR MULTI-CHANNEL SERVICES

(75) Inventors: Silvia Tenenti, Rome (IT); Mabel Pecorone, Rome (IT)

(73) Assignee: Accenture Global Services Limited (IE)

( * ) Notice: Subject to any disclaimer, the term of this patent is extended or adjusted under 35 U.S.C. 154(b) by 233 days.

(21) Appl. No.: 12/760,731

(22) Filed: Apr. 15, 2010

(65) Prior Publication Data

US 2010/0265940 A1  Oct. 21, 2010

(30) Foreign Application Priority Data

Apr. 20, 2009 (EP) .................................... 09425146

(51) Int. Cl.
*H04L 29/06*  (2006.01)
(52) U.S. Cl.
CPC ........ *H04L 65/1016* (2013.01); *H04L 65/1063* (2013.01); *H04L 65/40* (2013.01)
(58) Field of Classification Search
USPC ....................................................... 707/607
See application file for complete search history.

(56) References Cited

U.S. PATENT DOCUMENTS

| | | | |
|---|---|---|---|
| 7,433,304 B1 * | 10/2008 | Galloway et al. ............. | 370/229 |
| 7,865,459 B2 * | 1/2011 | Zimmerer et al. ............ | 707/602 |
| 7,979,554 B2 * | 7/2011 | Ho et al. ....................... | 709/227 |
| 2007/0117552 A1 * | 5/2007 | Gobburu et al. ........... | 455/414.1 |
| 2007/0118662 A1 * | 5/2007 | Vishwanathan et al. ...... | 709/227 |
| 2007/0223462 A1 | 9/2007 | Hite et al. ...................... | 370/356 |
| 2007/0264985 A1 * | 11/2007 | Kapur et al. ............... | 455/414.1 |
| 2008/0086552 A1 * | 4/2008 | Gorti et al. .................... | 709/223 |
| 2008/0219429 A1 * | 9/2008 | Mandalia et al. ........ | 379/266.02 |
| 2008/0307081 A1 | 12/2008 | Dobbins et al. .............. | 709/223 |
| 2009/0144420 A1 * | 6/2009 | Attanasio et al. ............. | 709/224 |
| 2009/0190603 A1 * | 7/2009 | Damola et al. ................ | 370/401 |
| 2009/0193071 A1 * | 7/2009 | Qiu et al. ...................... | 709/203 |
| 2010/0083045 A1 * | 4/2010 | Qiu et al. ........................ | 714/27 |
| 2014/0040352 A1 * | 2/2014 | Zacarias et al. ............... | 709/203 |

FOREIGN PATENT DOCUMENTS

JP  2005-504452 A  2/2005
WO  WO 02/065741 A2  8/2002

* cited by examiner

*Primary Examiner* — Timothy J Weidner
(74) *Attorney, Agent, or Firm* — Brinks Gilson & Lione

(57) ABSTRACT

An Internet protocol multimedia subsystem (IMS) application executes services, such as (Internet Protocol) IP contact center services, accessible over different access channels. An IMS application server includes a service creation layer operable to provide components for creating a hosted service, testing the hosted service and deploying the hosted service into a service execution layer. The service execution layer includes service logic components operable to execute the hosted service, and communication components operable to connect to an external service involved in executing the hosted service.

20 Claims, 16 Drawing Sheets

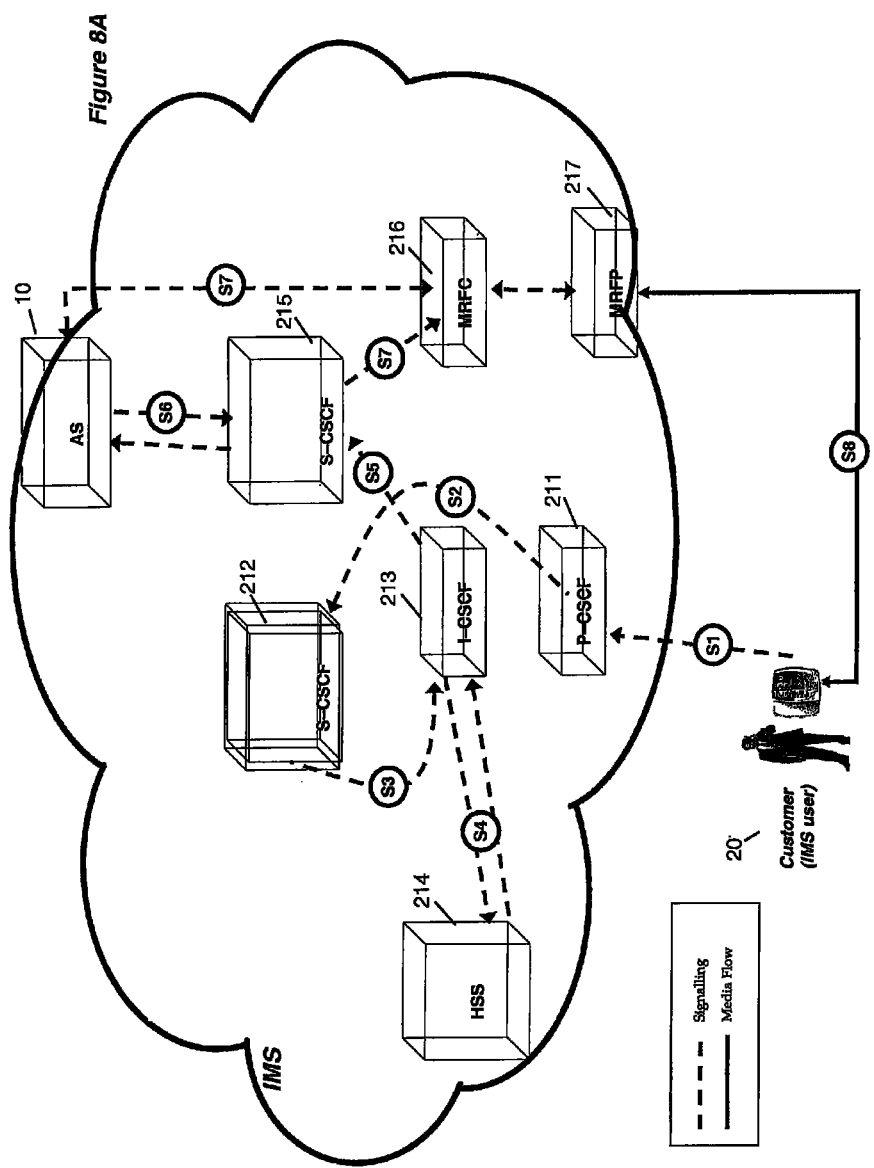

IMS APPLICATION FOR MULTI-CHANNEL SERVICES

BACKGROUND OF THE INVENTION

1. Priority Claim

This application claims the benefit of priority from European Patent Application No. 09 425 146.9, filed Apr. 20, 2009, which is incorporated by reference in its entirety.

2. Technical Field

This application relates generally to IMS (Internet protocol multimedia subsystem) technologies and in particular to an IMS application server, an IMS network, a computer-implemented method, and a computer program product for executing services accessible over a plurality of different access channels.

3. Related Art

There is a need for telecommunication companies and/or for enterprise companies to continuously improve and innovate their customer care services. At the same time, there is a need to reduce costs and to be more efficient in their operations and services provided.

In today's legacy networks used by such companies to handle and/or manage such services, each access channel (e.g., TDM, IPTV, and Web) needs its own application to manage a user contact. These legacy networks with a separate application for each access channel might also be referred to as vertical technological silos. Therefore, in this scenario, the service logic is replicated on each access channel and, in addition, the service creation may be complicated because the service creation environment may be scattered on multiple systems and/or network nodes.

Hence, there is a need to support the customer care ("caring") process and services and to enhance and enrich customer contact experience both on present and future communication access channels in order to address technical limitations that exist in many networks today.

SUMMARY

According to one general aspect, an IMS application server for executing services, such as IP Contact Center services, accessible over a plurality of different access channels is provided. The IMS application server may comprise: a service creation layer operable to provide components for creating at least one service, testing the at least one service and deploying the at least one service into a service execution layer; and said service execution layer comprising: service logic components operable to execute the at least one service; and communication components operable to connect to at least one external service provided by other systems and/or network nodes involved in executing the at least one service.

In other words, a service such as a service provided by a contact center system of a company, which may be accessible over different access channel (e.g., phone, TV, Internet, etc.) is provided within a server, referred to herein as IMS application server. That is, the contact center system is provided in terms of one or more services deployed and executed in the IMS application server. The IMS application server may be located in an IMS network. In particular, the IMS application server may be located in the service layer of an IMS network. The IMS application server may provide unified access to services hosted at the IMS access server independent of an access channel and corresponding access device used. A response to a service request from a user may be received at any access device, respectively.

In other words, a service provided by a contact center may become a service of the IMS network and is executed in the IMS application server. Consequently, the service may no longer need to be associated with specific terminals and corresponding specific access networks. Consequently, call flows to and from the service are optimized. Communication between users and services provided through the IMS application server in the IMS network becomes more efficient and independent from an access channel and corresponding devices used. Hence, man-machine interaction is improved. The user is relieved from the mental task of providing a separate system and access means for each possible access device and channel to access a service provided. Beyond, service access, service execution and service deployment are eased and made more efficient. Providing IMS enabled services becomes more flexible and can be adapted to specific needs.

In one exemplary implementation, the IMS application server may be an IP Contact Center (IPCC) IMS application server. In particular, the IPCC IMS application server allows the service logic to be decoupled from the call control and media control and provides a single service creation environment to runtime design, modify, and/or deploy services.

According to one aspect, the IMS application may be located in a service layer of an IMS network.

According to another aspect, the service may be uniquely accessible from the plurality of different access channels.

According to yet another aspect, the service creation layer may comprise a graphical development environment (service designer) associated with a node library and a drag-and-drop functionality for designing the service as a flow graph.

According to yet another aspect, the service logic components may be further operable to interact with the service creation layer for creating the service and deploying and/or undeploying or removing the service which is communicated through at least one of the communication components.

Consequently, even a non-technical user can easily define and deploy services which are then provided through the IMS application server.

According to yet another aspect, the plurality of different access channels may comprise: one or more protocols, one or more physical connections, and/or wired or wireless connections.

Accordingly, the plurality of different access channels over which the IMS application server may be accessible may comprise one or more different protocols (e.g., ISDN, VoiceIP, UMTS, and GPRS) and/or one or more different physical connections (e.g., telephone connection, mobile phone connections, Internet, Web, broadband communication lines, and TV enabled connections). Furthermore, the access channels may be wired or wireless.

According to yet another aspect, the service may be an IP contact center service.

According to yet another aspect, the IMS application server may be a standardized element of an IMS network.

According to another general aspect, an IMS network is provided. The IMS network may comprise: a service layer operable to host an IMS application server according to any one of the preceding claims such that at least one service in the system is executed in said IMS application server on the service layer; a control and transport layer operable to deliver the at least one service over a plurality of different access channels; and an access layer comprising a plurality of different access devices usable with the plurality of different access channels.

According to yet another aspect, the control and transport layer may be further operable to provide control and routing functions for SIP sessions, enable communications between IMS entities and other network domains (e.g. PSTN, PLMN).

According to yet another general aspect, a computer-implemented method for executing services, such as IP Contact Center services, accessible over a plurality of different access channels on an IMS application server is provided. The computer-implemented method may comprise: providing components for creating at least one service, testing the at least one service and deploying the at least one service into a service execution layer; receiving a request for the at least one service over at least one of a plurality of different access channels; executing the at least one service; and connecting to at least one external service provided by other systems and/or network nodes involved in executing the at least one service.

In yet another general aspect there is provided a computer-program product comprising computer readable instructions, which when loaded and run in a computer system and/or computer network system, cause the computer system and/or the computer network system to perform a method as described.

According to yet another aspect, the IMS application server may be used in an IMS network.

The subject matter described in this specification can be implemented as a method or as a system or using computer program products, tangibly embodied in information carriers and machine readable media, such as a CD-ROM, a DVD-ROM, a semiconductor memory, and a hard disk. Such computer program products may cause a data processing apparatus to conduct one or more operations described in this specification. In other implementations, the logic that implements the subject matter described in this specification may be encoded in a signal or data stream.

In addition, the subject matter described in this specification can also be implemented as a system including a processor and a memory coupled to the processor. The memory may store or encode one or more programs that cause the processor to perform one or more of the method acts described in this specification.

Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

FIG. 8A shows an exemplary flow diagram of a service request in an IMS architecture comprising an IMS application server.

DETAILED DESCRIPTION OF THE PREFERRED EMBODIMENTS

In the following, a detailed description of examples will be given with reference to the drawings. It should be understood that various modifications to the examples may be made. In particular, elements of one example may be combined and used in other examples to form new examples and system implementations.

An IP Multimedia Subsystem (IMS) may be an architectural framework for delivering Internet protocol (IP) multimedia services. To ease the integration with the Internet, IMS uses a specific protocol wherever possible, e.g., session initial protocol (SIP). In principal, IMS may not standardize applications but rather may aid the access of multimedia and/or voice applications from wireless and/or wired terminals, i.e. create a form of fixed mobile convergence. The IMS may be realized by a horizontal control layer that isolates the access network (i.e., the access layer) from the service layer. From a logical perspective, services may not have their own control functions, as the control (and transport) layer is a common horizontal layer.

In principle, an IMS (Internet Protocol Multimedia Subsystem) network architecture may be a software and/or hardware system realized in a distributed environment such as the World Wide Web (WWW or Web for short) which may provide a standardized way to deliver IP (Internet Protocol) based services or web services that are enabled by one common core and control functionality for a plurality of different types of networks. In general, an IMS architecture may be built of at least three layers: a service layer, a transport and control layer, and an access layer. Through the access layer and the transport and control layer access to the service layer may be provided in a unified way from a plurality of different access channels used by different end-user devices, such as telephone, IPTV, workstation, personal computers, and mobile devices such as handhelds and cell phones. Accordingly, the plurality of different access channels over which the IMS application server may be accessible may comprise one or more different protocols (e.g., ISDN, VoiceIP, UMTS, and GPRS) and/or one or more different physical connections (e.g., telephone connection, mobile phone connections, Internet, Web, broadband communication lines, and TV enabled connections). Furthermore, the access channels may be wired or wireless.

An IMS application server may support and manage an IP contact center accessible through a plurality of different access channels, e.g. the IMS application server provides a (web) service for IP contact centers. According to the present description the IMS application server may exist in the service layer of the IMS architecture such that its services are executable on the service layer of the IMS architecture. The IMS application server can be designed to work as a standardized unit, with clear interfaces to other IMS units in the IMS architecture.

Figure 1:
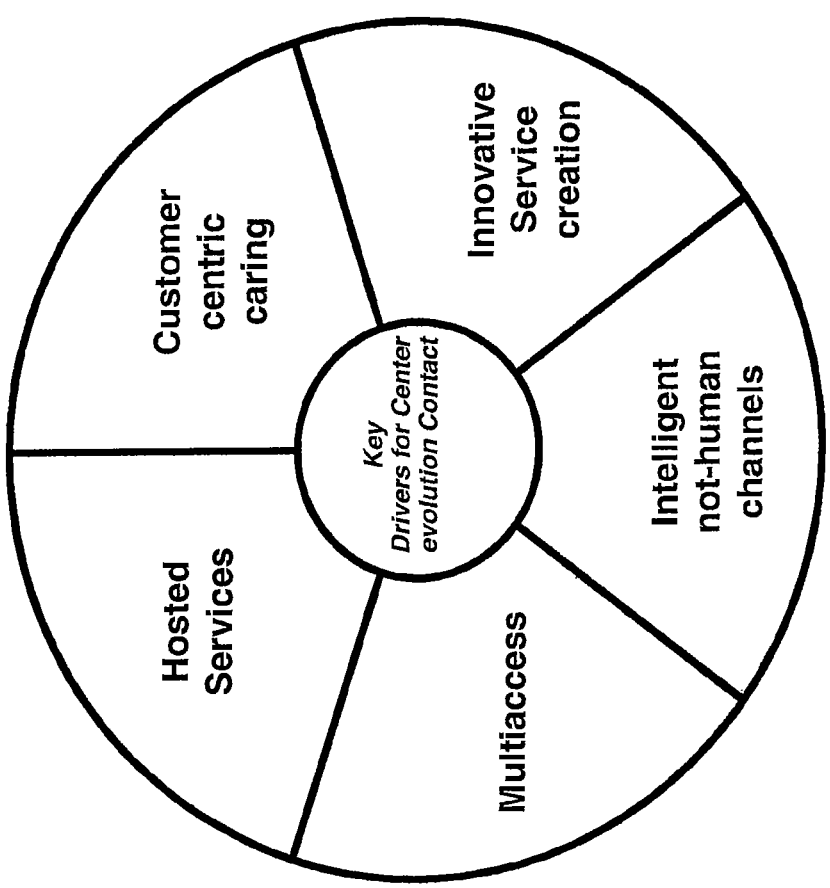
FIG. 1 shows a block diagram of exemplary technical advantages achieved with an IMS application server.

Telecommunication and/or enterprise companies require continuous improvement and innovation for their customer care services, which may be realized as web applications and/or web services. Furthermore, telecommunication and/or enterprise companies seek to reduce the costs for such services while at substantially the same time being more efficient in their operations and services offered. Implementing an IMS application server according to the present invention achieves these objectives by realizing several technical advantages, which are illustrated in FIG. 1. One technical advantage of implementing the IMS application server of the present invention may include hosted services. Particularly, since the IMS application server may comprise hosted services, new services may become available for external systems and/or services. For example, contact center services may become available to other (external) companies accessing the IMS application server of the present invention. Another technical advantage of implementing the IMS server of the present invention may include multi-access capabilities. Since the IMS application sever may support multiple access channels, a user (such as a customer) may contact a service not only by voice (such as via telephone) but also by using a different media. The IMS application server may support this multi-access functionality by separating service logics and (access) channel management. For example, the IMS application server could provide (substantially) the same (logical) rules for determining routing and responses for a plurality of different access channels. Furthermore, the IMS application server may support intelligent non-human (access) channels. For example, services may activate themselves, e.g., in order to balance costs and quality of provided services. Additionally, the IMS application server may support innovative service creation. For example, non-technical users may reconfigure applications and/or services provided on the IMS application server without performing any (software) programming. In addition, the IMS application server may support user centric caring by a segmentation and/or classification of different users into different groups and/or by utilizing dynamic user profiles. In other words, for each group or kind of user, service logics of the IMS application server may be personalized.

Figure 2:
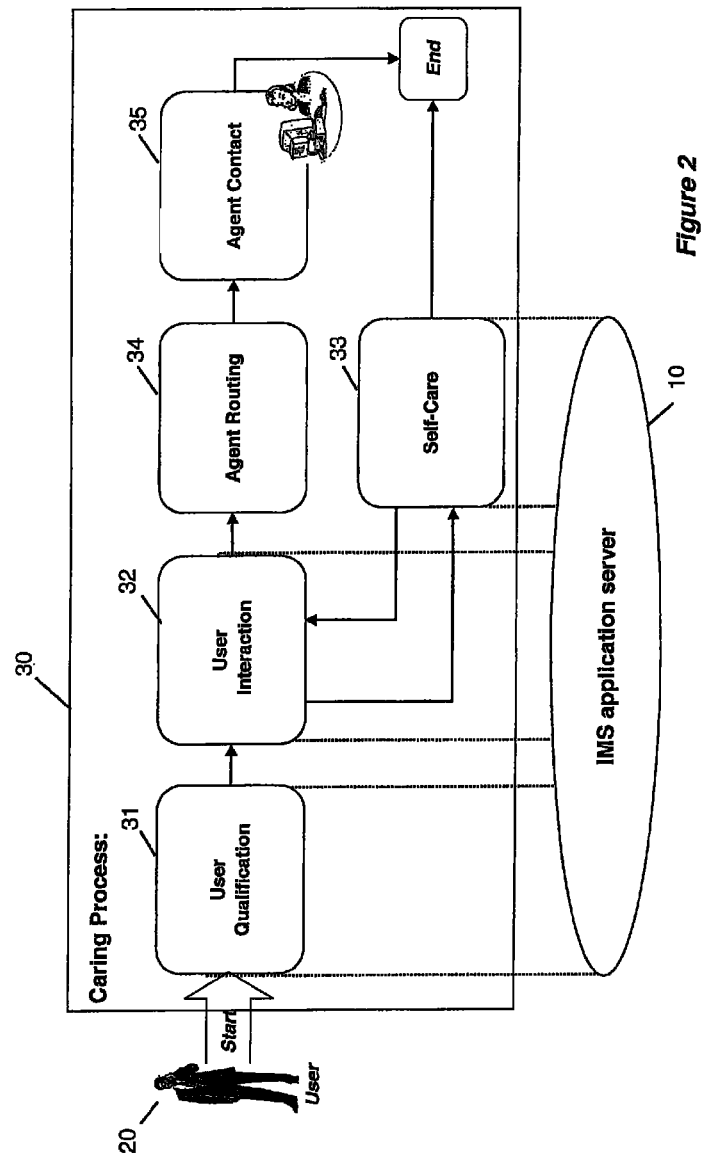
FIG. 2 shows a flow diagram of an exemplary caring process and using an IMS application server.

FIG. 2 shows a flow diagram of an exemplary caring process 30 that is supported by an IMS application server 10. When a user 20 contacts by an access channel (e.g., by phone, TV, computer, and mobile device) a service provided through the IMS application server 10, the user may be qualified at 31 according to his/her dynamic (user) profile (e.g., a specific segment s/he is interested in at least one service s/he is subscribed to, etc.). After user qualification, at 32, the IMS application server 10 may automatically adapt its interactions with the user 20 according to the dynamic profile of the user 20, such that specific needs of the user 20 can be considered when executing a service of the IMS application server 10. At 33, the IMS application server 10 provides self-care to the user 20 based on real-time interaction between the user 20 and an operation support system (OSS) and/or a business support system (BSS) of a company contacted through the IMS application server 10 in order to provide the user 20 with self-provision and/or assurance capabilities. Regarding self-care, self-provision and/or assurance capabilities, a user may be supported by the IMS application server 10 in contacting a service and/or creating and deploying a service e.g. by providing help functions. Beyond, through 34 and 35, the user 20 is queued and routed according to one or more agents' availability data which may be retrieved from one or more agent routing engines, e.g., computer telephony integration (CTI).

Figure 3:
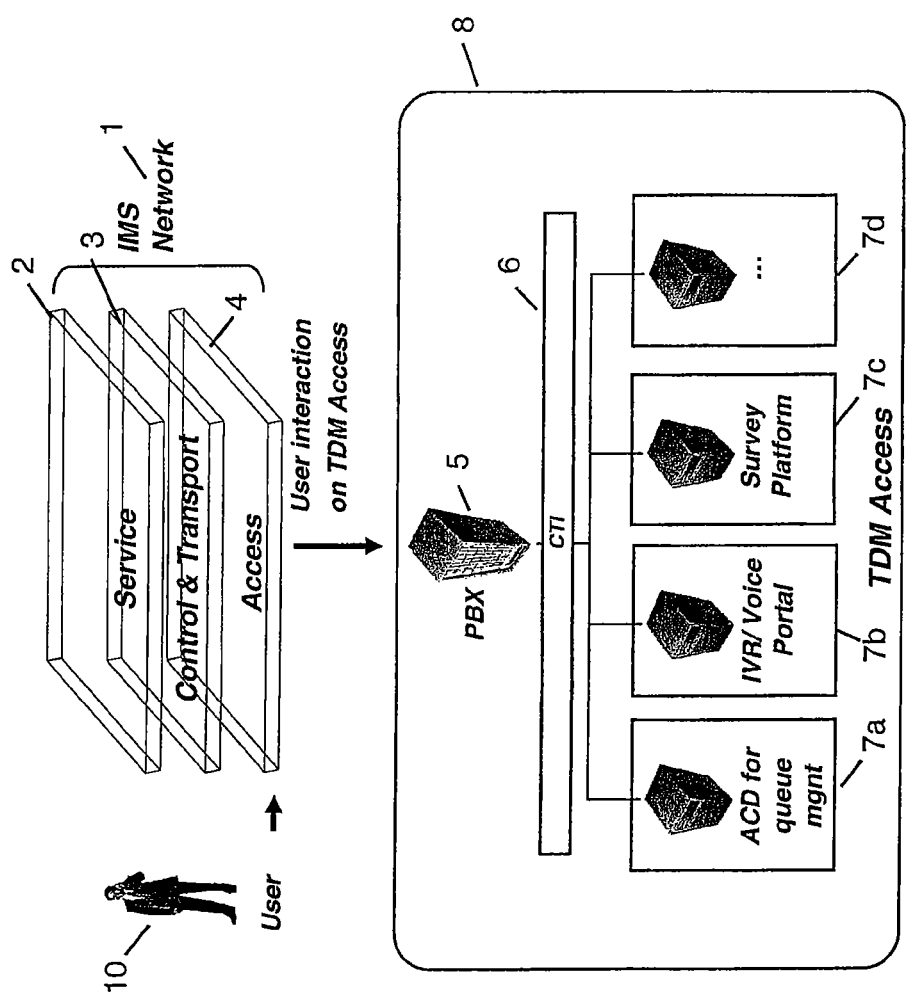
FIG. 3 shows a prior art legacy contact center architecture.

FIG. 3 shows a prior art legacy software- and/or hardware-based architecture for contact center services which may be supported by one or more telecommunication (TLC)/information technology (IT) systems. Such prior art systems perform specialized tasks and functionalities by using proprietary APIs, device drivers, and/or technologies. For example, a user 10 accesses a contact center 8, e.g., through a private branch exchange (PBX) 5, using a TDM (time division multiplexing) access, such as T1, T2, or E1 communication networks, through an IMS network 1, comprising a service layer 2, a control and transport layer 3, and an access layer 4. Such a prior art contact center architecture is positioned in a data center and thus, as shown in FIG. 3, is not part of the IMS network architecture 1. Therefore, in the prior art contact center architecture it is necessary to access the services and/or functionalities provided by the contact center through access links (e.g., telephone networks) to the data center. The access provided by the access links needs to be proportional to a traffic volume. Additionally, costs for leasing access links are often expensive.

On the contact center side 8, each provided functionality, application and/or service of the contact center is implemented by a specific system 7a, 7b, 7c, 7d. In order to integrate the different systems 7a, 7b, 7c, 7d proprietary CTI (computer telephony integration) links 6, APIs and/or proprietary extensions to the protocols on the access links are required, leading to a rather complex implementation of the system. Due to the complexity, modifications to the functionality, application, and/or service systems 7a, 7b, 7c, 7d is difficult and complex, and requires significant effort to test and debug new and/or modified functionality of the systems 7a, 7b, 7c, 7d. Consequently, new features and/or capabilities can be delayed. Furthermore, if an implementation of such a prior art contact center 8 requires resources which go beyond the capabilities of the used hardware platform, adding additional boards and/or servers can be complex and expensive.

Figure 4:
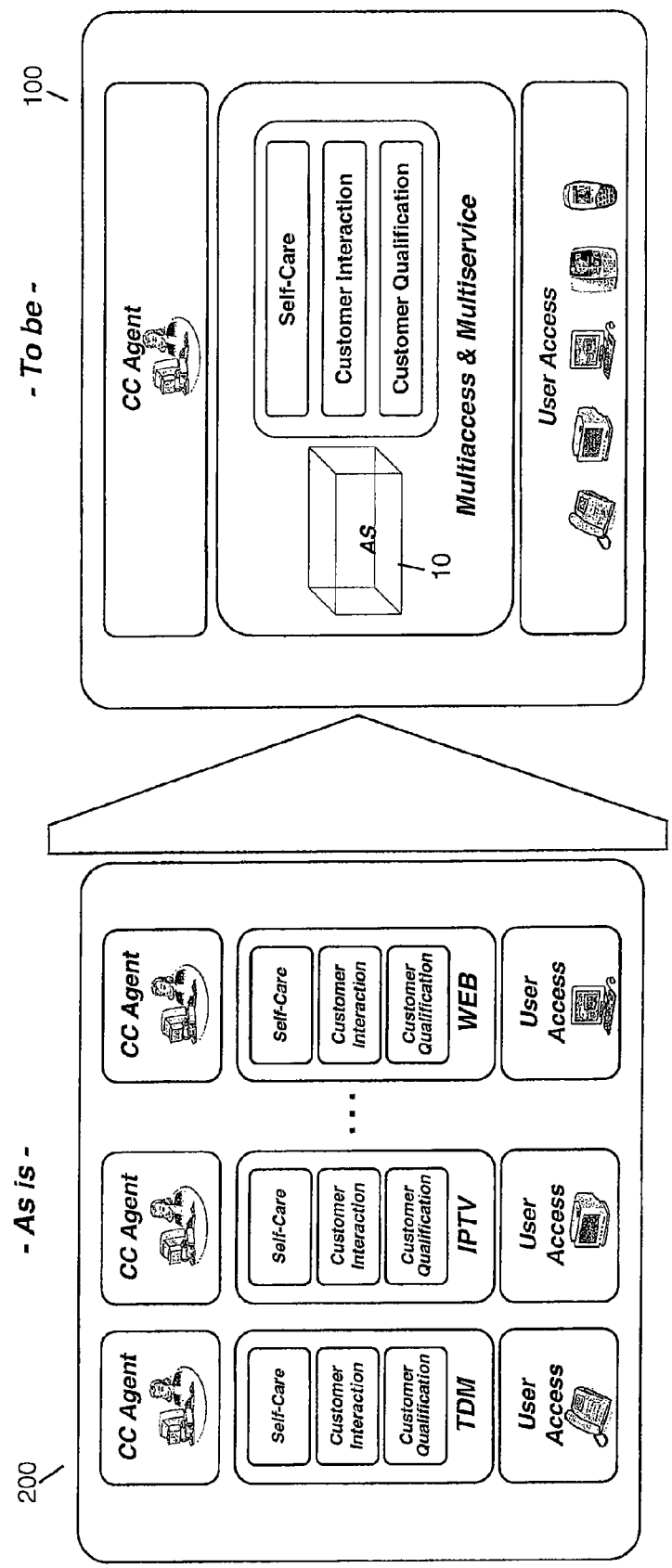
FIG. 4 shows a comparison between a prior art legacy network and a legacy network comprising an exemplary IMS application server.

FIG. 4 shows a comparison between a prior art contact center system 200 as described in FIG. 3 and a contact center system 100 according to the present description. One difference between the prior art contact center system 200 and the contact center system 100 is that the system 100 exploits IMS network architecture to enhance and enrich user contact using established and foreseen (communication) access channels. In this way, technical limitations of the prior art contact center system 200 can be addressed. For example, as shown in FIG. 4, the prior art contact center system 200 requires that each access channel be considered separately for a respective service or application. In particular, each access channel must be uniquely configured to manage an incoming user request through the corresponding access channel. In contrast, a contact center system 100 requires only a single service or application to manage user requests from a plurality of different access channels. In other words, by providing an IMS application server 10 comprising services for the different functionalities required to process a user request, a user request can be uniformly processed and/or executed for any access channel used by the user (e.g., the process is independent of the channel).

Figure 5:
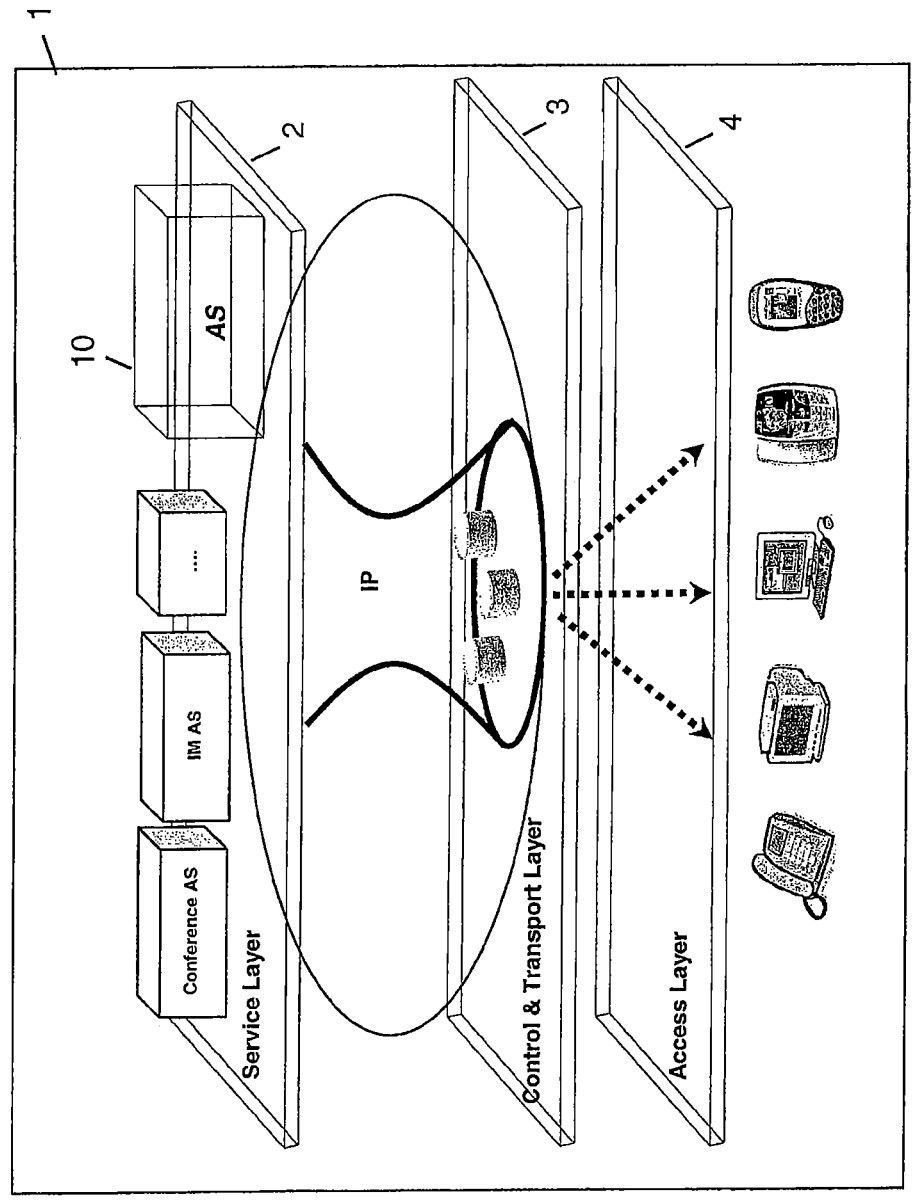
FIG. 5 shows a block diagram of an exemplary location of an IMS application server in an IMS architecture.

FIG. 5 shows an exemplary IMS network architecture 1 comprising a service layer 2, a control and transport layer 3, and an access layer 4. IMS network architecture is a standardized means to deliver IP-based services which are enabled by common core and transport means for a plurality of different types of networks. One or more services are executed in application servers on the service layer 2. The control and transport layer 3 (i.e., common core and transport means) provides common functionality for controlling access and transporting data and/or information to and from the services of the application servers which are accessed by one or more users through different access channels. The functionality provided by the control and transport layer 3 may be reused by each of the application servers and/or further services provided in the IMS network 1. Furthermore, the control and transport layer 3 is access independent. Hence, a service from the application servers of the service layer 2 may be delivered to a user over one or more types of access channels (or access technologies). The control and transport layer 3 seamlessly works across wired and/or wireless communication access channels, such as communication channels and/or lines related to telephone, VoIP, TDM, workstations, personal computers, Web, notebooks, handhelds, and cell phones.

As shown in FIG. 5, an IMS application server 10 (for a contact center system or application) is located and implemented at the service layer 2 of the IMS network such that the contact center services may become a service of the IMS network 1. Furthermore, said services are processed and executed at the IMS application server 10. Consequently, the contact center services are not associated with specific applications and systems for each corresponding access channel, unlike the prior art. By providing the IMS application server 10 as part of the IMS network 1 in the service layer 2, a call flow to the contact center services and possibly further services are optimized and new applications and/or service models may be enabled, such as a hosted contact center service.

Figure 6:
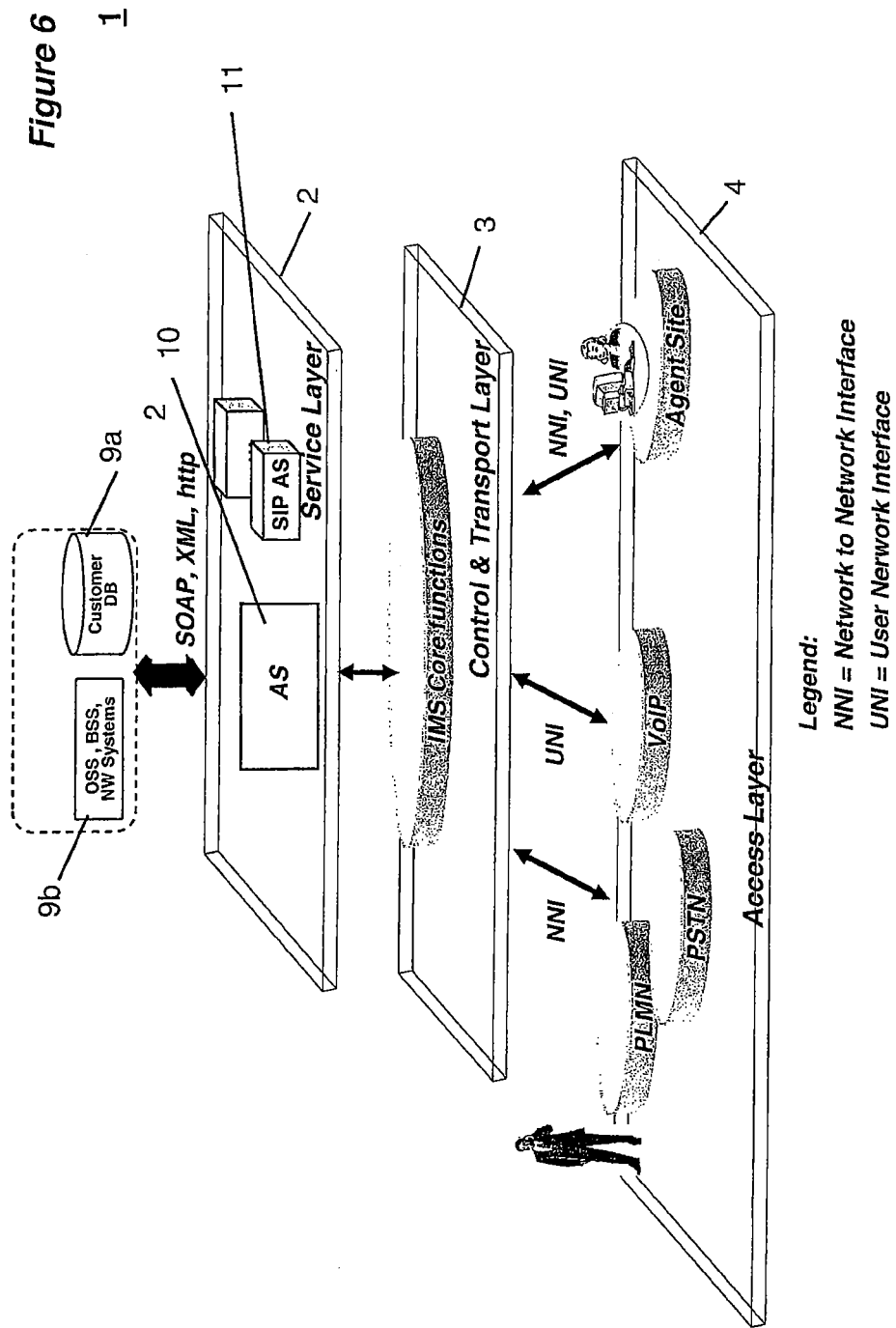
FIG. 6 shows a further block diagram of an exemplary location of an IMS application server in an IMS architecture.

FIG. 6 shows a further exemplary IMS network architecture 1. The IMS application server 10 may have access (using standard tools for web service applications, such as SOAP, XML, and HTTP) to at least one user database 9a and/or operation support systems (OSS), business support systems (BSS) 9b, and/or other network systems of one or more contact centers, for example. By providing the IMS application server in the service layer 2 of the IMS network, a single set of business (and/or computation) logic may process and execute responses to user requests from different access channels. Additionally, by locating the IMS application server in the service layer 2 of the IMS network 1, one or more external application servers, such as an application servers using session initial protocol (SIP AS) 11, may be accessed to provide enhanced functionality to services provided through the IMS application server 10 (e.g., a chat service with a virtual assistant). Additionally, a plurality of different kinds of multimedia resource functions (MRF) may be provided with the IMS application server 10.

As described above, the control and transport layer 3 provides common functionality for controlling access and transporting data and/or information to and from the services of the application servers which are accessed by one or more users through different access channels. Thus, the control and transport layer 3 may provide a service from the application servers of the service layer 2 to a user at access layer 4 over one or more types of access channels (or access technologies) ." For example, access layer 4 may include various domains, such as PLMN, PSTN, VoIP or even an agent site, that provide a user with access to the IMS server 10. The domains may interface the control and transport layer 3 through a NNI (Network to Network Interface) and the agent site may interface the control and transport layer 3 through a UNI (User Network Interface).

Figure 7:
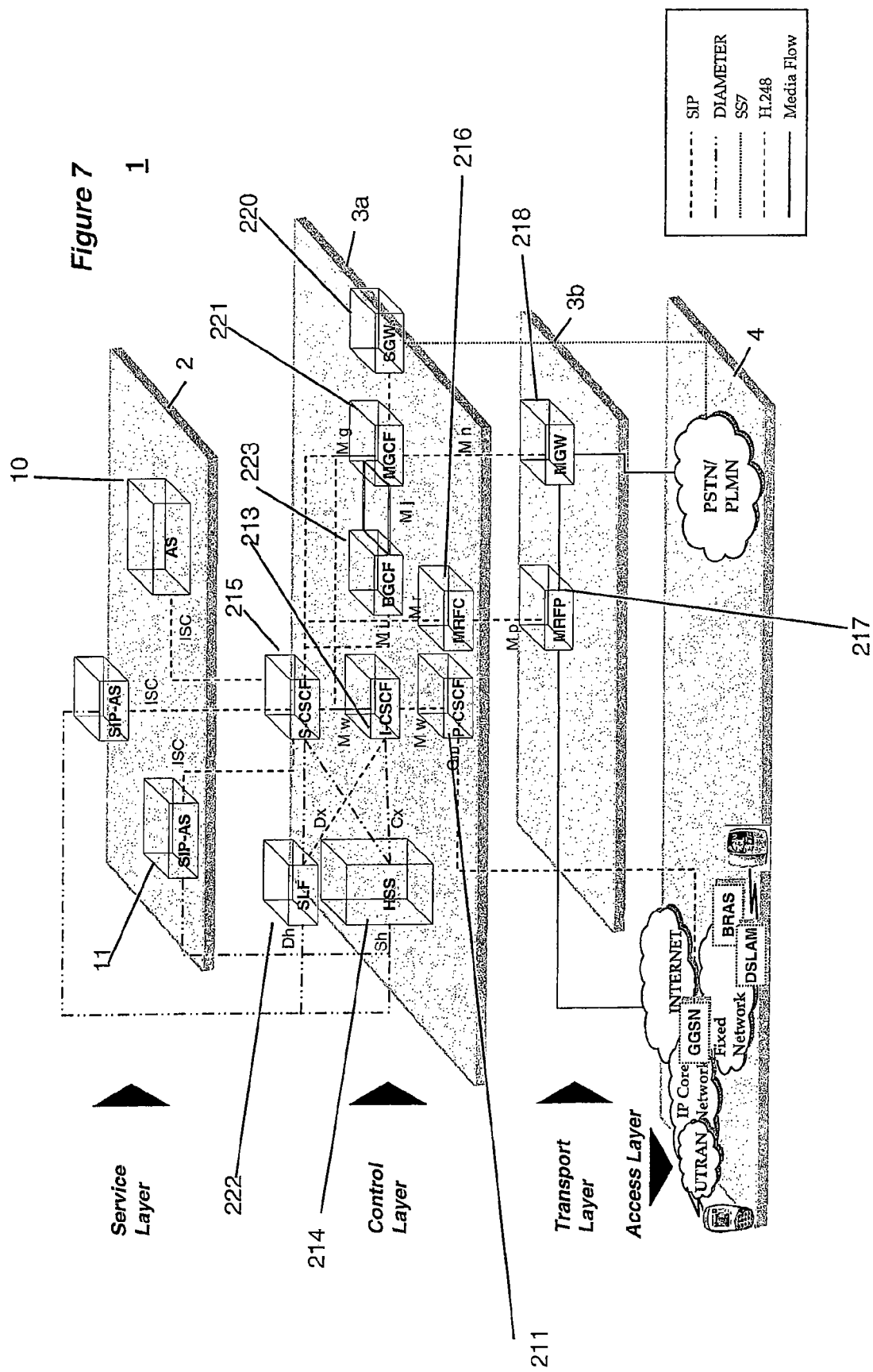
FIG. 7 shows a block diagram of exemplary relations between components of an IMS architecture comprising an IMS application server.

FIG. 7 shows exemplary interactions of an IMS application server 10 with one or more units and/or functionalities provided by an IMS network 1 on three layers 2, 3, 4, wherein the layer 3 may be considered to comprise two sub-layers 3a, 3b. The service layer 2 hosts and executes one or more services provided by one or more application servers, including an IMS application server 10. A control layer 3a provides control and routing functionalities for SIP sessions. Furthermore, the control layer 3a enables communication between IMS units such as users, services, etc. and/or other domains (e.g., via PSTN and PLMN). A transport layer 3b is connected with the control layer 3a and the access layer 4. The transport layer 3b and the access layer 4 provide an IP connection to one or more devices used by one or more users to enable access to a service provided on the service layer 2.

In one embodiment, a control layer 3a may include a Home Subscriber Server (HSS) 214, Subscriber Location Function (SLF) 222, a Proxy-Call Session Control Function (P-CSCF) 211, an Interrogating-Call Session Control Function (I-CSCF) 213, a Serving-Call Session Control Function (S-CSCF) 215, a Media Resource Function Controller (MRFC) 216, a Breakout Gateway Control Function (BGCF) 223, a Media Gateway Controller Function (MGCF) 221, and a Signaling Gateway (SGW) 220, which are described in more detail later. The transport layer 3b may include a Media Resource Function Processor (MRFP) 217 and a Media Gateway (MGW) 218, which also are described later.

The IP Multimedia Network (Subsystem) or IMS network 1 may include a collection of different functions, linked by standardized interfaces, which when grouped form one IMS (administrative) network. A function to operate in the IMS network 1 is not a node (hardware box); an implementer is free to combine two functions in one node, or to split a single function into two or more nodes. Each node may also be present multiple times in a single network, for load balancing or organizational issues.

A user may connect to an IMS network in various ways, all of which use the standard Internet Protocol (IP). Direct IMS terminals (such as mobile phones, personal digital assistants (PDAs) and computers) can register directly on an IMS network, even when they are roaming in another network or country (the visited network). One requirement may be that they can use IPv6 (also IPv4 in early IMS) and run Session Initial Protocol (SIP) user agents. Fixed access (e.g., Digital Subscriber Line (DSL), cable modems, Ethernet), mobile access (e.g. W-CDMA CDMA2000, GSM, GPRS) and wireless access (e.g. WLAN, WiMAX) are all supported. Other phone systems like plain old telephone service (POTS—the old analogue telephones), H.323 and non IMS-compatible VoIP systems, are supported through gateways.

The Home Subscriber Server (HSS), or User Profile Server Function (UPSF), may be a master user database that supports the IMS network entities that actually handle calls. It contains the subscription-related information (subscriberprofiles), performs authentication and authorization of the user, and can provide information about the subscriber's location and IP information. It is similar to the GSM Home Location Register (HLR) and Authentication Center (AUC).

A Subscriber Location Function (SLF) is needed to map user addresses when multiple HSSs are used. Both the HSS and the SLF communicate through the Diameter protocol. This Diameter is also called as AAA protocol i.e Authentication, Accounting and Authorization.

Normal 3GPP networks use the following identities:
International Mobile Subscriber Identity (IMSI)
Temporary Mobile Subscriber Identity (TMSI)
International Mobile Equipment Identity (IMEI)
Mobile Subscriber ISDN Number (MSISDN)

IMSI is a unique phone identity that is stored in the SIM. To improve privacy, a TMSI is generated per geographical location. While IMSI/TMSI are used for user identification, the IMEI is a unique device identity and is phone specific. The MSISDN is the telephone number of a user.

IMS also requires IP Multimedia Private Identity (IMPI) and IP Multimedia Public Identity (IMPU). Both are not phone numbers or other series of digits, but Uniform Resource Identifiers (URIs), that can be digits (a tel-uri, like tel:+1-555-123-4567) or alphanumeric identifiers (a sip-uri, like sip:john.doe@example.com). There can be multiple IMPU per IMPI (often a tel-uri and a sip-uri). The IMPU can also be shared with another phone, so both can be reached with the same identity (for example, a single phone-number for an entire family).

The HSS subscriber database contains, the IMPU, IMPI, IMSI, and MSISDN, subscriber service profiles, service triggers and other information.

Several roles of Session Initial Protocol (SIP) servers or proxies, collectively called Call Session Control Function (CSCF), are used to process SIP signaling packets in the IMS.

A Proxy-CSCF (P-CSCF) is a SIP proxy that is the first point of contact for the IMS terminal. It can be located either in the visited network (in full IMS networks) or in the home network (when the visited network isn't IMS compliant yet). Some networks may use a Session Border Controller for this function. The terminal discovers its P-CSCF with either DHCP, or it is assigned in the PDP Context (in General Packet Radio Service (GPRS)).
- it is assigned to an IMS terminal during registration, and does not change for the duration of the registration
- it sits on the path of all signaling messages, and can inspect every message
- it authenticates the user and establishes an IPsec security association with the IMS terminal. This prevents spoofing attacks and replay attacks and protects the privacy of the user. Other nodes trust the P-CSCF, and do not have to authenticate the user again.
- it can also compress and decompress SIP messages using SigComp, which reduces the round-trip over slow radio links
- it may include a Policy Decision Function (PDF), which authorizes media plane resources e.g. quality of service (QoS) over the media plane. It's used for policy control, bandwidth management, etc. The PDF can also be a separate function.
- it also generates charging records A Serving-CSCF (S-CSCF) is the central node of the signaling plane. It is a SIP server, but performs session control too. It is always located in the home network. It uses Diameter Cx and Dx interfaces to the HSS to download and upload user profiles—it has no local storage of the user. All necessary information is loaded from the HSS.
- it handles SIP registrations, which allows it to bind the user location (e.g. the IP address of the terminal) and the SIP address
- it sits on the path of all signaling messages, and can inspect every message
- it decides to which application server(s) the SIP message will be forwarded, in order to provide their services
- it provides routing services, typically using Electronic Numbering (ENUM) lookups
- it enforces the policy of the network operator
- there can be multiple S-CSCFs in the network for load distribution and high availability reasons. It's the HSS that assigns the S-CSCF to a user, when it's queried by the I-CSCF.

An Interrogating-CSCF (I-CSCF) is another SIP function located at the edge of an administrative domain. Its IP address is published in the Domain Name System (DNS) of the domain (using NAPTR and SRV type of DNS records), so that remote servers can find it, and use it as a forwarding point (e.g. registering) for SIP packets to this domain. The I-CSCF queries the HSS using the Diameter Cx interface to retrieve the user location (Dx interface is used from I-CSCF to SLF to locate the needed HSS only), and then routes the SIP request to its assigned S-CSCF. Up to Release 6 it can also be used to hide the internal network from the outside world (encrypting part of the SIP message), in which case it's called a Topology Hiding Inter-network Gateway (THIG). From Release 7 onwards this "entry point" function is removed from the I-CSCF and is now part of the Interconnection Border Control Function (IBCF). The IBCF is used as gateway to external networks, and provides NAT and Firewall functions (pinholding).

Application servers (AS) may host and execute services, and interface with the S-CSCF using Session Initiation Protocol (SIP). An example of an application server that is being developed in is the call continuity Function (VCC Server). Depending on the actual service, the AS can operate in SIP proxy mode, SIP UA (user agent) mode or SIP B2BUA (back-to-back user agent) mode. An AS can be located in the home network or in an external third-party network. If located in the home network, it can query the HSS with the Diameter Sh interface (for a SIP-AS) or the Mobile Application Part (MAP) interface (for IM-SSF).

SIP AS: native IMS application server
IP Multimedia Service Switching Function (IM-SSF): an IM-SSF interfaces with Customized Applications for Mobile networks Enhanced Logic (CAMEL) Application Servers using Camel Application Part (CAP)
Open Service Access-Service Capability Server (OSA-SCS): Interface to the OSA framework Application Server The Media Resource Function (MRF) may provide media related functions such as media manipulation (e.g. voice stream mixing) and playing of tones and announcements.

Each MRF is further divided into a Media Resource Function Controller (MRFC) and a Media Resource Function Processor (MRFP).
- The MRFC is a signaling plane node that acts as a SIP User Agent to the S-CSCF, and which controls the MRFP across an H.248 interface
- The MRFP is a media plane node that implements all media-related functions.

A Breakout Gateway Control Function (BGCF) is a SIP server that includes routing functionality based on telephone numbers. It is only used when calling from the IMS to a phone in a circuit switched network, such as the Public Switched Telephone Network (PSTN) or the Public land mobile network (PLMN).

A PSTN/CS gateway interfaces with PSTN circuit switched (CS) networks. For signaling, CS networks use ISDN User Part (ISUP) (or BICC) over Message Transfer Part (MTP), while IMS uses Session Initiation Protocol (SIP) over IP. For media, CS networks use Pulse-code modulation (PCM), while IMS uses Real-Time Transport Protocol (RTP).

A Signaling Gateway (SGW) interfaces with the signaling plane of the CS. It transforms lower layer protocols as Stream Control Transmission Protocol (SCTP, an Internet Protocol (IP) protocol) into Message Transfer Part (MTP, an Signaling System 7 (SS7) protocol), to pass ISDN User Part (ISUP) from the MGCF to the CS network.

A Media Gateway Controller Function (MGCF) does call control protocol conversion between SIP and ISUP and interfaces with the SGW over SCTP. It also controls the resources in a Media Gateway (MGW) across an H.248 interface.

A Media Gateway (MGW) interfaces with the media plane of the CS network, by converting between RTP and PCM. It can also transcode when the codecs don't match (e.g. IMS might use AMR, PSTN might use G.711).

Media Resources are those components that operate on the media plane and are under the control of IMS Core functions, in particular, Media Server (MS) and Media Gateway (MGW).

There may be two types of Next generation Networking Interconnection:

Service oriented Interconnection (SoIx): The physical and logical linking of NGN domains that allows carriers and service providers to offer services over NGN (i.e. IMS and PES) platforms with control, signaling (i.e. session based), which provides defined levels of interoperability. For instance, this is the case of "carrier grade" voice and/or multimedia services over IP interconnection. "Defined levels of interoperability" are dependent upon the service or the QoS or the Security, etc.

Connectivity oriented Interconnection (CoIx): The physical and logical linking of carriers and service providers based on simple IP connectivity irrespective of the levels of interoperability. For example, an IP interconnection of this type is not aware of the specific end to end service and, as a consequence, service specific network performance, QoS and security requirements are not necessarily assured. This definition does not exclude that some services may provide a defined level of interoperability. However only SoIx fully satisfies NGN interoperability requirements.

An NGN interconnection mode can be direct or indirect. Direct interconnection refers to the interconnection between two network domains without any intermediate network domain. Indirect interconnection at one layer refers to the interconnection between two network domains with one or more intermediate network domain(s) acting as transit networks. The intermediate network domain(s) provide(s) transit functionality to the two other network domains. Different interconnection modes may be used for carrying service layer signaling and media traffic.

Offline charging may be applied to users who pay for their services periodically (e.g., at the end of the month). Online charging, also known as credit-based charging, is used for prepaid services, or real-time credit control of postpaid services. Both may be applied to the same session.

Offline Charging: All the SIP network entities (P-CSCF, I-CSCF, S-CSCF, BGCF, MRFC, MGCF, AS) involved in the session use the Diameter Rf interface to send accounting information to a Charging Collector Function (CCF) located in the same domain. The CCF will collect all this information, and build a Call Detail Record (CDR), which is sent to the billing system (BS) of the domain.

Each session carries an IMS Charging Identifier (ICID) as a unique identifier. Inter Operator Identifier (IOI) parameters define the originating and terminating networks.

Each domain has its own charging network. Billing systems in different domains will also exchange information, so that roaming charges can be applied.

Online charging: The S-CSCF talks to an Session Charging Function (SCF) which looks like a regular SIP application server. The SCF can signal the S-CSCF to terminate the session when the user runs out of credits during a session. The AS and MRFC use the Diameter Ro interface towards an Event Charging Function (ECF).

When Immediate Event Charging (IEC) is used, a number of credit units is immediately deducted from the user's account by the ECF and the MRFC or AS is then authorized to provide the service. The service is not authorized when not enough credit units are available.

When Event Charging with Unit Reservation (ECUR) is used, the ECF first reserves a number of credit units in the user's account and then authorizes the MRFC or the AS. After the service is over, the number of spent credit units is reported and deducted from the account; the reserved credit units are then cleared.

Exemplary call flows of a user accessing at least one service provided by the IMS application server 10 in the architecture shown in FIG. 7 are described with reference to FIGS. 8A and 8B.

FIG. 8A shows an exemplary interaction of the IMS application server 10 with the IMS network architecture 1 to provide to a user 20 accessing at least one service provided by the IMS application server 10 through an IMS access channel, qualification, interaction, and/or self-care services as shown in FIG. 2, for example. For example, the plurality of (IMS) different access channels over which the IMS application server 10 may be accessible may comprise one or more different protocols (e.g., ISDN, VoiceIP, UMTS, and GPRS) and/or one or more different physical connections (e.g., telephone connection, mobile phone connections, Internet, Web, broadband communication lines, and TV enabled connections). Furthermore, the access channels may be wired or wireless.

At S1, a user 20 calls a service number (e.g. a customer care number of a contact center provided through the IMS application server 10). Said user request is sent to a proxy-call session control function (P-CSCF) 211 which forwards the user request to a serving-call session control function (S-CSCF) 212 at S2. The S-CSCF 212 checks a profile of the user 20 having sent the user request and then, at S3, sends the user request to on interrogating-call session control function (I-CSCF) 213. At S4, the I-CSCF 213 retrieves from a home subscriber service (HSS) 214 the address of a S-CSCF 215, which manages services such as contact center services of the IMS application server 10. At S5, the I-CSCF 213 forwards the user request to said S-CSCF 215. At S6, the S-CSCF 215 checks the profile of the user 20 corresponding to the user request and sends the user request to the IMS application server 10. At S7, the IMS application server 10 controls or manages a multimedia resource function controller (MRFC) 216 with the service logic of the service requested at the IMS application server 20 and then forwards the user request to the MRFC 216. Finally, at S8, according to said service logic, the MRFC 216 creates a media (access) channel to a device used by the user 20 through a multimedia resource function processor (MRFP) 217 in order to provide the requested information and/or data to the user 20.

Figure 8B:
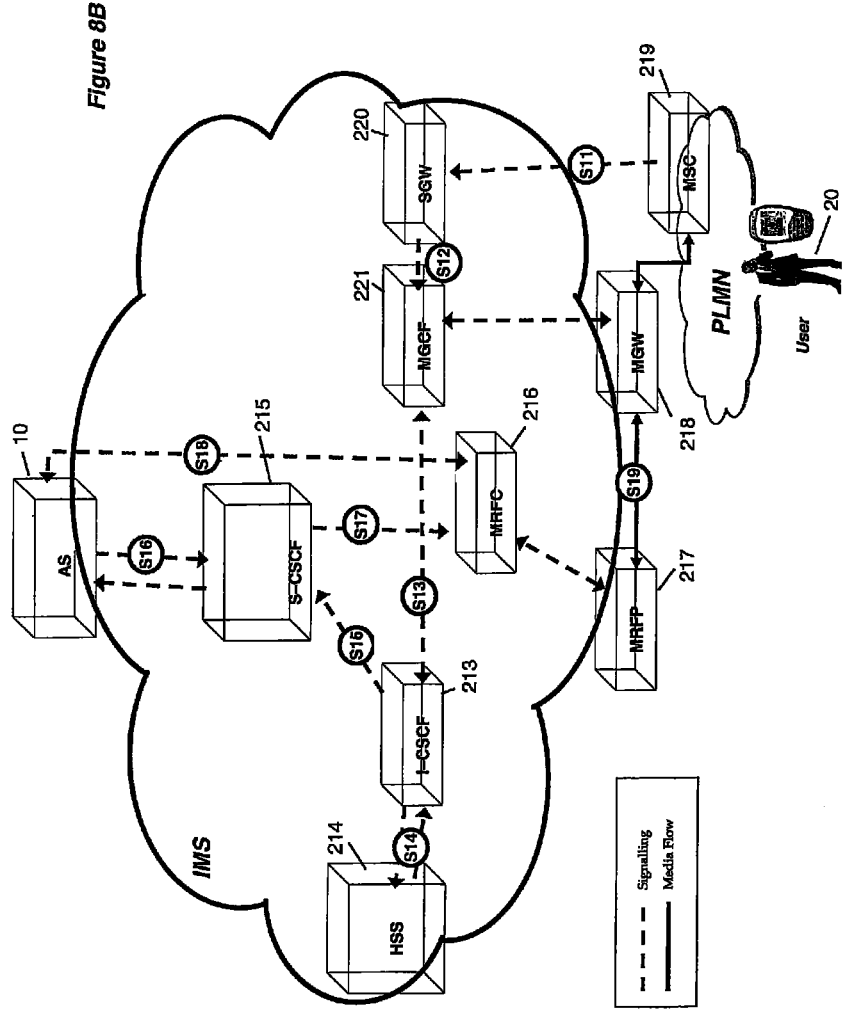
FIG. 8B shows a further exemplary flow diagram of a service request in an IMS architecture comprising an IMS application server.

FIG. 8B shows an exemplary interaction of the IMS application server 10 with the IMS network 1 to provide to a user 20 accessing at least one service provided by the IMS application server 10 through a PLMN (public land mobile network) access channel, qualification, interaction and/or self-services, as shown in FIG. 2 for example.

At S11, a user 20 calls a service number (e.g. a customer care number of a contact center provided through the IMS application server 10). The PLMN network recognizes that the user request belongs to an IMS domain and sends the user request through a signaling gateway function (SGW) 220 to a media gateway control function (MGCF) 221 at S12. At S13, the MGCF 221 forwards the user request to an interrogating-call session control function (I-CSCF) 213. At 14, the I-CSCF 213 retrieves from a home subscriber server (HSS) 114 the address of a serving-call session control function (S-CSCF) 215. At S15, the I-CSCF 213 forwards the user request to the S-CSCF 215 using the address retrieved from the HSS 214. The S-CSCF 215 manages contact center services from the IMS application server 10. At S16, the S-CSCF 215 checks a profile of the user 20 having sent the user request and sends, the user request to the IMS application server 10. The IMS application server 10 manages and controls a multimedia resource function controller (MRFC) 216 using its business logic at S17 through the S-CSCF 215 and forwards, at S18 the user request to the MRFC 216. According to the business logic of the IMS application server 10, the MRFC creates a media channel using a media gateway (MGW) 218, at S19, with a device used by the user through a multimedia resource function processor (MRFP) 217 in order to provide a response to the user request.

Figure 9A:
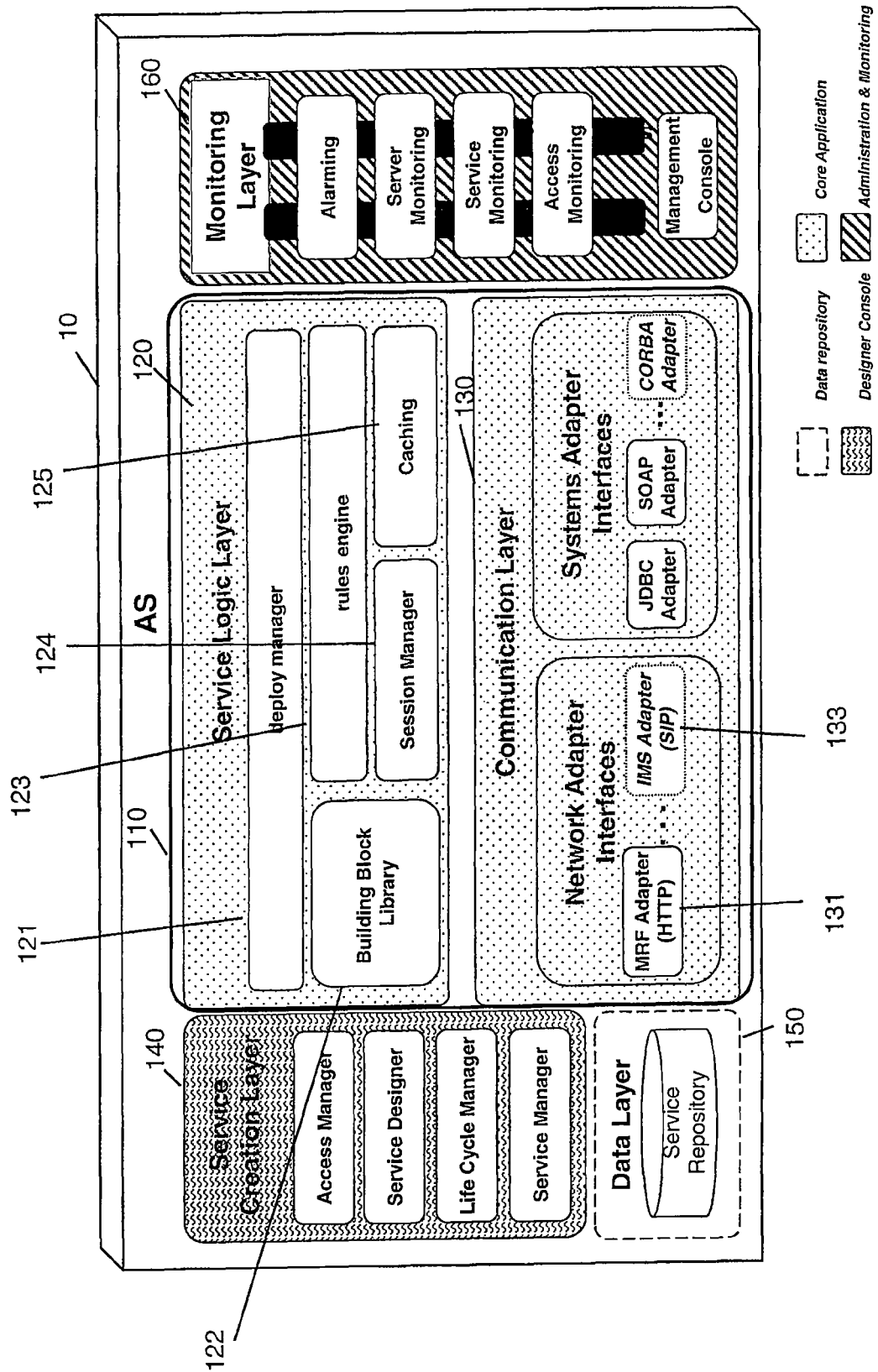
FIG. 9A shows a block diagram of an exemplary architecture of an IMS application server.

FIG. 9A shows an exemplary architecture of the IMS application server 10. The IMS application server 10 comprises a service execution layer 110 having a service logic layer 120 and a communication layer 130, a service creation layer 140, a data layer 150, and a monitoring layer 160. The communication layer 130 may comprise one or more network adapter interfaces, e.g. an MRF adapter 131 and/or an IMS adapter 133. Furthermore, the communication layer may comprise one or more system adapters such as adapters for JDBC, SOAP, and/or CORBA. JDBC (Java Database Connectivity) is an API for the Java programming language that defines how a client may access a database. It may provide methods for querying and updating data in a database. SOAP (Simple Object Protocol) is a protocol specification for exchanging structured information in the implementation of web services in computing networks. CORBA (Common Object Requesting Broker Architecture) is a standard that enables software components written in multiple computer languages and running on multiple computers to work together. The data layer 150 may include a service repository for storing data and/or information on services provided through the IMS application server 10. Monitoring layer 160 may include alarming functionality, monitoring of the IMS application server 10 as well as of services provided by the IMS application server 10. Furthermore, the monitoring layer 160 provides access to the monitoring functionality through a management console for a user managing and controlling at least one service provided through the IMS application server 10. The service logic layer 120 and the creation layer 140, which are particular to the IMS application server 10 compared to common application servers, are described in more detail in FIGS. 9B to 9F.

Figure 9B:
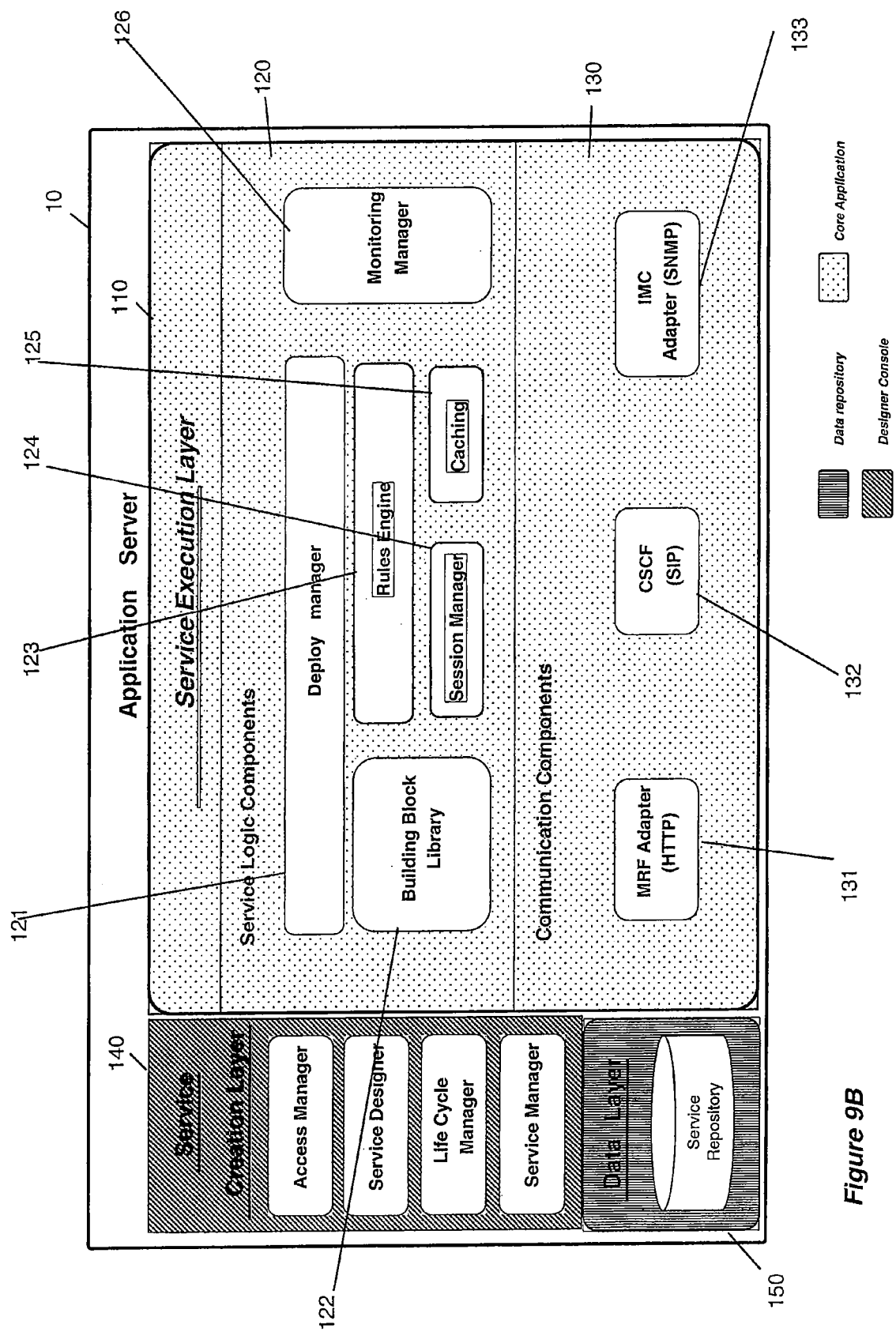
FIG. 9B shows a further block diagram of an exemplary architecture of an IMS application server.

An alternative exemplary architecture of the IMS application server 10 is shown in FIG. 9B, wherein the service logic layer 120 comprising one or more service logic components 121 to 126 and the communication layer 130 comprising one or more communication components 131 to 133 are implemented within a service execution layer 110.

The service creation layer 140 and the service execution layer 110 are described in more detail in FIGS. 9C to 9F.

Figures 9C, 9D:
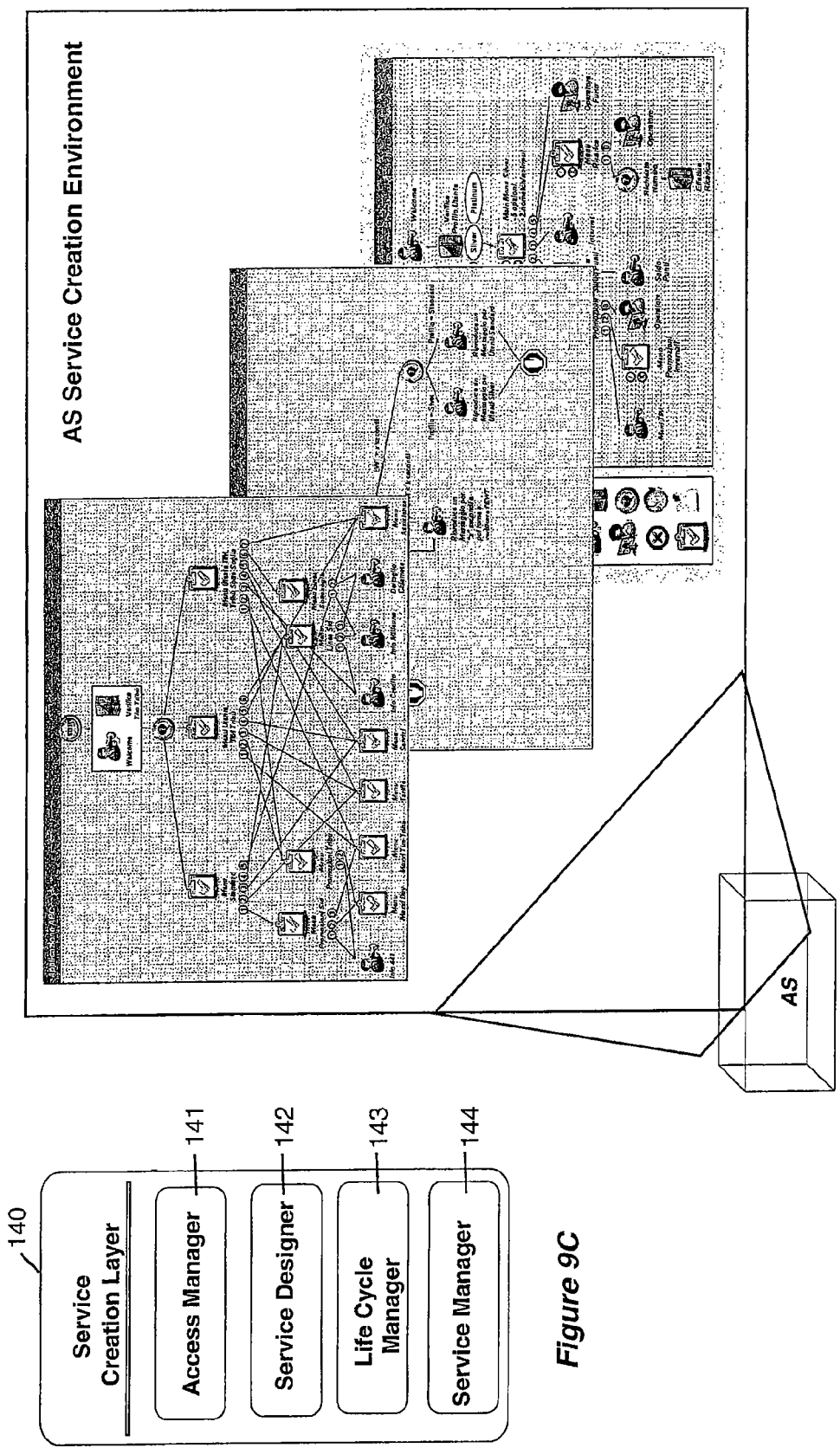
FIG. 9C shows a block diagram of an exemplary service creation layer comprised in an IMS application server.
FIG. 9D shows a diagram of an exemplary service creation environment provided with a service creation layer of an IMS application server.

FIG. 9C shows an exemplary implementation of the service creation layer 140 of the IMS application server 10. The service creation layer 140 may support a user, developer, and/or administrator to design, test and the deploy services, which can be supported by the IMS application server 10. The service creation layer 140 may comprise an access manager 141, a service designer 142, a life cycle manager 143, and a service manager 144.

The access manager 141 may be operable to manage accounts of the application server 10 and/or user profiles of users, who may request a service at the IMS application server 10. A user of a service (e.g., a contact center service) provided through the IMS application server 10 may create one or more tenants. Possibly another user may create one or more groups from the tenants. Possibly yet another user may manage one or more users belonging to one or more of said groups. Furthermore, the access manager 141 may support a user or a designer in designing and/or managing one or more applications and/or services provided by the IMS application server 10. Said applications and/or services may be validated and or managed by a user, such as an approver.

The service designer 142 may comprise a graphical user interface or environment for designing and/or managing applications and/or services. For this purpose, the service designer 142 may provide one or more (possibly) predefined node types and/or drag and drop functionality to design applications and/or services in terms of flow diagrams e.g. in a graph-like structure.

The life cycle manager 143 may implement life cycle logic for the applications and/or services during design-time of services and/or applications, i.e., before said services and/or applications are deployed into the service execution layer 110 of the IMS application server 10.

The service manager 144 is operable to enable and/or support service management, comprising selection of details, creating views, activation, publishing, deactivation, and/or deletion of services and or applications.

FIG. 9D shows examples of creating new services and/or applications using the service creation layer 140. As shown, the service creation layer 140 provides a user-friendly, web-based tool (which is referred to herein after as service creation environment) which enables or allows also non-technical users to design, manage, and/or deploy services and/or applications provided with the IMS application server 10. For example, using the service creation environment, a user can easily interact with and a contact center service realized on the IMS application server 10.

As shown in FIG. 9D, a drag and drop functionality is supported by the service creation layer 140 in a service creating environment to design and/or manage business logic for services and/or applications for interaction with a user requesting a service at the IMS application server 10. The business logic may comprise self-service and/or a queuing logic for queuing incoming user requests. Furthermore, the service creation environment may provide an (intelligent)

node library comprising node types. In this way, input and output data management to guide user interactions with services and/or applications is simplified. Additionally, the business logic for the services and/or applications is visualized using a graph structure instead of a tree structure. Hence, the same application becomes re-usable in the same or a different service.

Figure 9E:
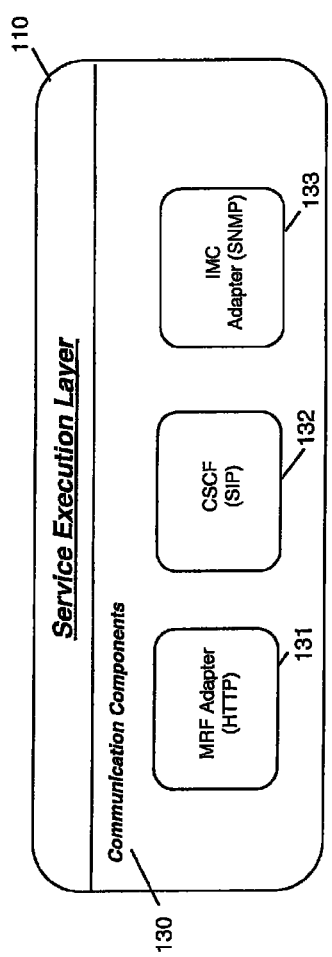
FIG. 9E shows a block diagram of exemplary communication components of a service execution layer of an IMS application server.

FIG. 9E shows an exemplary implementation of the communication components 130 in the service execution layer 110 of the IMS application server 10. The communication components 130 may include adapters 131, 132 and 133 that support communication between services of the IMS application server 10 and external units, external OS (operation support) and/or BS (business support) systems, and/or managers to manage units in the IMS network.

In one implementation, the communication components 130 of service execution layer 110 may comprise a multimedia resource function (MRF) adapter 131, a call session control function (CSCF) adapter 132, and an intelligent network management center (IMC). The MRF adapter 131 may support http communication, e.g. by exchanging Vxml files between the IMS application server 10 and the MRF. The CSCF adapter 132 may support session initiation protocol (SIP) communication and the IMC adapter 133 may support SNMP communication.

The MRF adapter may be used for facilitating and adapting aspects such as the playing of announcements, media transcoding, and/or conferencing.

The CSCF adapter may be an IMS entity responsible for processing subscriber and application server requests which are in the form of SIP messages. Depending on a specific request scenario, one or more CSCFs can be involved when processing the request, such as P-CSCF, I-CSCF, and S-CSCF.

The IMC adapter may be used for adaptation to SNMP (simple network management protocol). SNMP is part of the TCP/IP (Transmission Control Protocol/Internet Protocol) suite and may be used to control and manage IP gateways and other network functions.

Figure 9F:
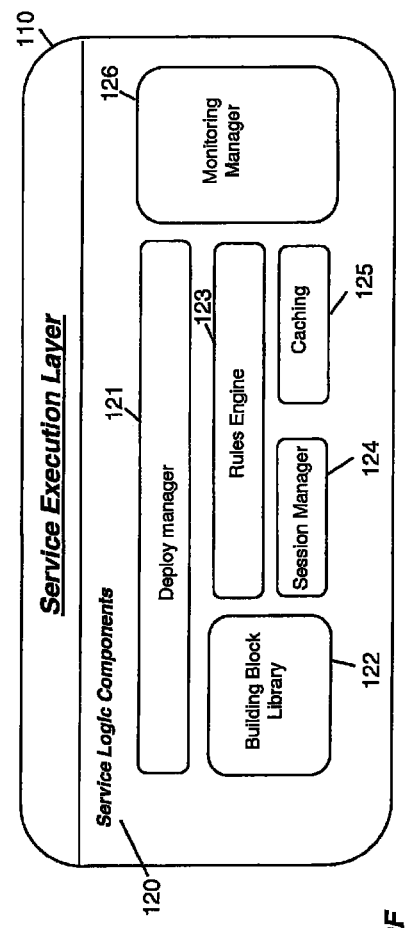
FIG. 9F shows a block diagram of exemplary service logic components of a service execution layer of an IMS application server.

FIG. 9F shows an exemplary implementation of service logic components 121-126 in the service execution layer 110 of the IMS application server 10. The service logic components 121-126 may execute services and/or applications designed in the service creation layer 140. The (flow) graphs may be managed through VXML (Voice XML) files, which are provided to the MRF adapter 131.

In one implementation, the service execution layer 110 may comprise a deploy manager 121, a building block library 122, a rule engine 123, a session manager 124, a caching component 125, and a monitoring manager 126. The deploy manager 121 may support deploying and/or the removal of services and/or service versioning management. The building block library 122 may be implemented as a Java library repository and may support node type actions. The building block library may be used to design services in the service creation layer 140 and/or to execute services in the service logic layer 120. The rule engine 123 may comprise rules to execute services. The session manager 124 may manage enterprise-to-enterprise (E2E) sessions during execution of a service. The session manager 124 may comprise a session handler and a service manager. The session handler may be responsible for setting up and/or shutting down sessions (during execution of a service) and may manage time outs. The service manager may operate on the session handler and the rule engine 123 and may implement execution logic for services to be executed. The caching component 125 may be a cache system comprising session information. The monitoring manager 126 may provide system fault and performance data to an external server and may handle alarms.

Figure 10:
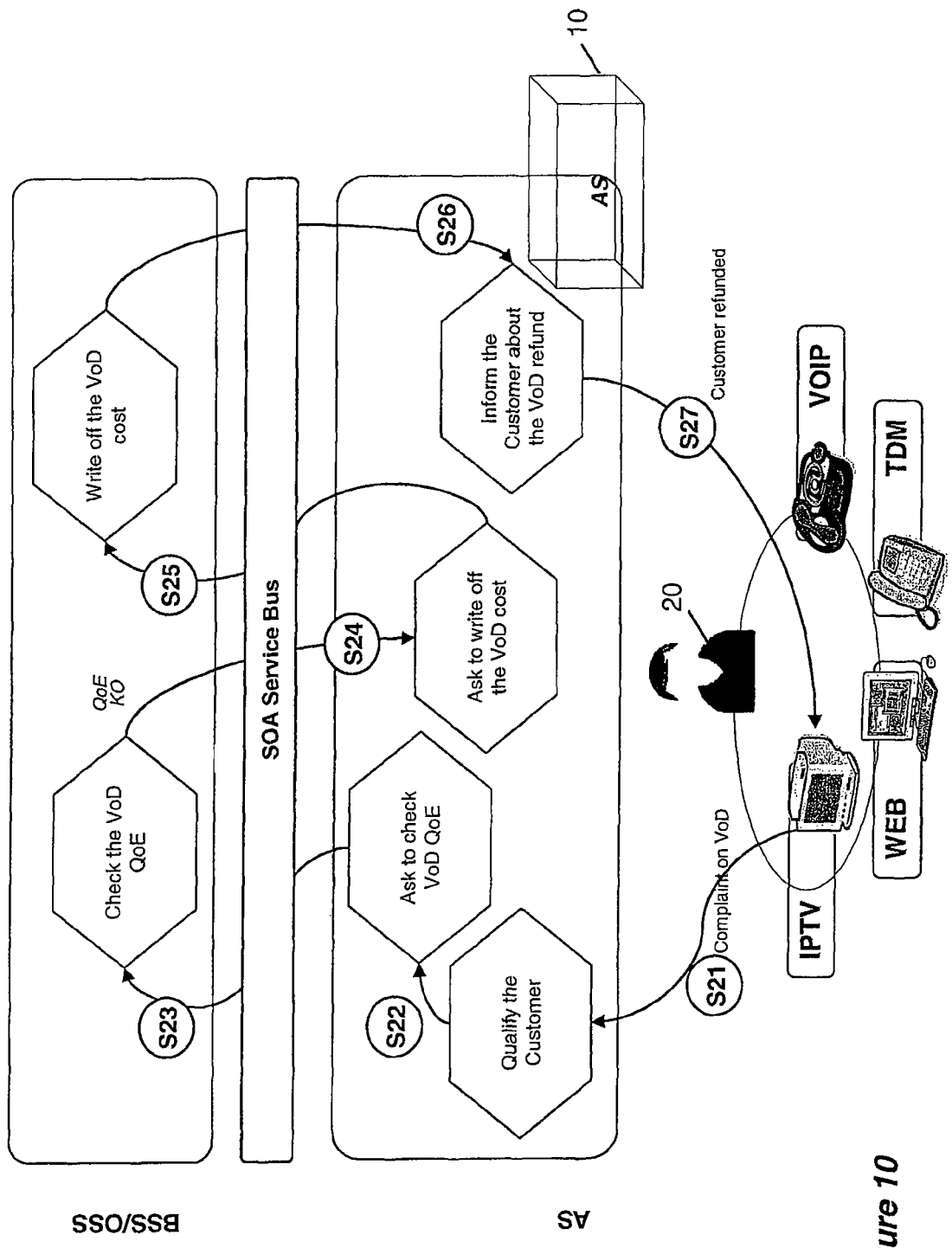
FIG. 10 shows a flow diagram of an exemplary service request through an IMS application server.

FIG. 10 shows an exemplary use case of the IMS application server 10 when a user 20 contacts the IMS application server 10 to request a service using IPTV. The user 20 may contact the IMS application server 10 via IPTV at S21, e.g., to complain on a poor quality of his/her video on demand service s/he has bought. At S22 and S23, the quality of experience of the video on demand service is first requested and then checked. At S24 and S25, the IMS application server 10 asks to write off the costs related to the low quality of experience of the video on demand service. Finally, at S26, the user 20 is informed about the analysis by sending a response to the user request to the user's 20 IPTV device used and at S27 the user is refunded.

Figure 11:
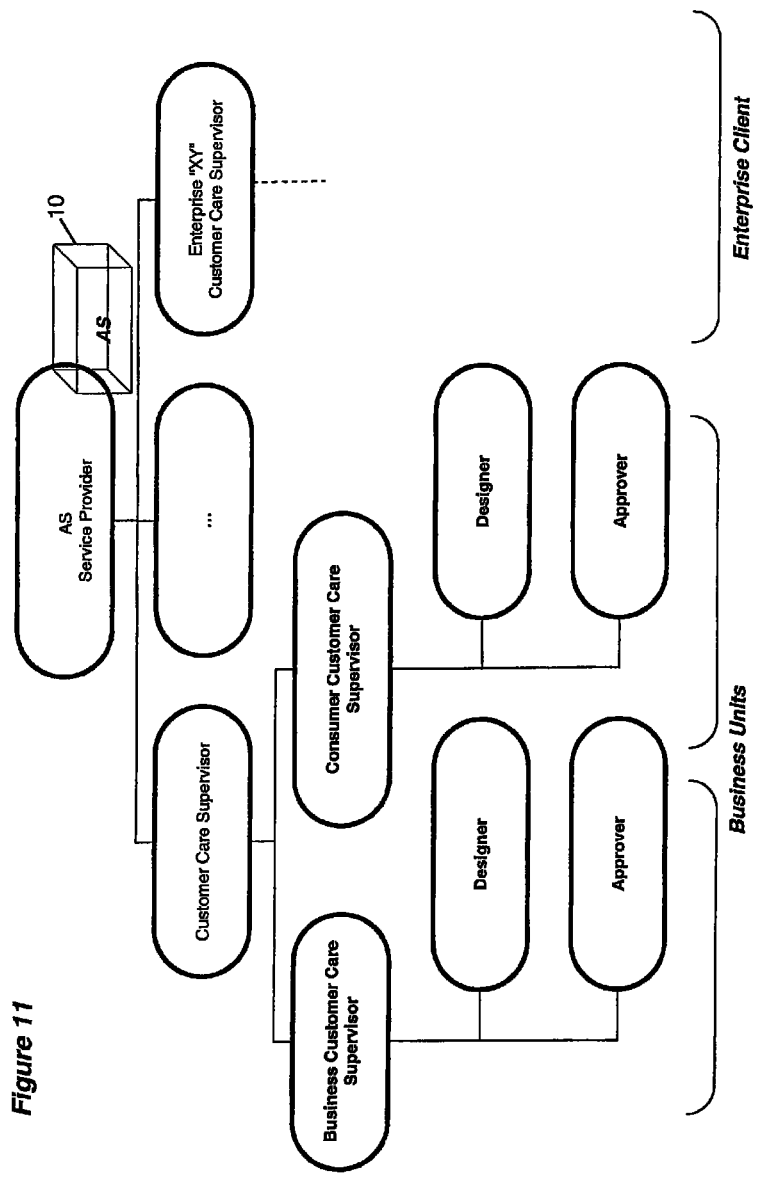
FIG. 11 shows a block diagram of exemplary units and/or clients operable to operate through an IMS application server.

FIG. 11 shows an exemplary implementation of the IMS application server 10 for a telecommunication service provider for its contact center services that are provided to enterprise clients. The IMS application server 10 may host a plurality of services. For example, each telecommunication business unit may have its own service creation environment to design its own service and hence the corresponding service logic.

Said services then may be used to provide and sell services to external clients. The external clients, in turn, may design and deploy their own services with corresponding service logic (substantially) independent from the telecommunication business unit. Furthermore, each client may be provided with a separate service creation environment that is customized according to its brand.

Consequently, the pre-existing services created and deployed by the telecommunication unit have no impact on the services created by the clients.

Figure 12:
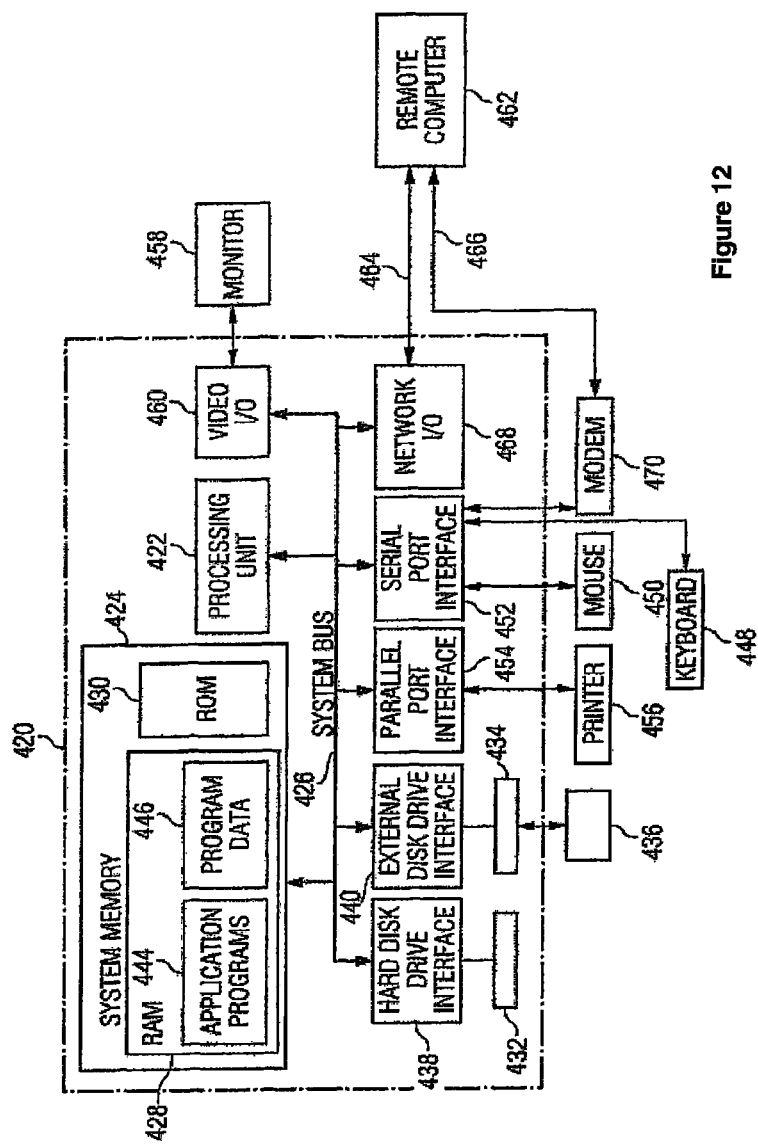
FIG. 12 shows a block diagram of an exemplary computer (network) system.

With reference to FIG. 12, an exemplary system for implementing the invention includes a general purpose computing device in the form of a conventional computing environment 420 (e.g. personal computer), including a processing unit 422, a system memory 424, and a system bus 426, that couples various system components including the system memory 424 to the processing unit 422. The processing unit 422 may perform arithmetic, logic and/or control operations by accessing system memory 424. The system memory 424 may store information and/or instructions for use in combination with processing unit 422. The system memory 424 may include volatile and non-volatile memory, such as random access memory (RAM) 428 and read only memory (ROM) 430. A basic input/output system (BIOS) containing the basic routines that helps to transfer information between elements within the personal computer 420, such as during start-up, may be stored in ROM 430. The system bus 426 may be any of several types of bus structures including a memory bus or memory controller, a peripheral bus, and a local bus using any of a variety of bus architectures.

The personal computer 420 may further include a hard disk drive 432 for reading from and writing to a hard disk (not shown), and an external disk drive 434 for reading from or writing to a removable disk 436. The removable disk 436 may be a magnetic disk for a magnetic disk driver or an optical disk such as a CD ROM for an optical disk drive. The hard disk drive 434 and external disk drive 434 are connected to the system bus 426 by a hard disk drive interface 438 and an external disk drive interface 440, respectively. The drives and their associated computer-readable media provide nonvolatile storage of computer readable instructions, data structures, program modules and other data for the personal computer 420. The data structures may include relevant data of the implementation of the computer-implemented method, server, network, and computer program product for executing services accessible over a plurality of different access channels as described in more detail above. The relevant data may be organized in a database, for example a relational or object database.

Although the exemplary environment described herein employs a hard disk (not shown) and an external disk, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 430 or RAM 428, including an operating system (not shown), one or more application programs 444, other program modules (not shown), and program data 446. The application programs 444 may include at least a part of the functionality as detailed in FIGS. 1 to 10.

A user may enter commands and information, as discussed below, into the personal computer 420 through input devices such as keyboard 448 and mouse 450. Other input devices (not shown) may include a microphone (or other sensors), joystick, game pad, scanner, or the like. These and other input devices may be connected to the processing unit 422 through a serial port interface 452 that is coupled to the system bus 426, or may be collected by other interfaces, such as a parallel port interface 454, game port or a universal serial bus (USB). Further, information may be printed using printer 456. The printer 456 and other parallel input/output devices may be connected to the processing unit 422 through parallel port interface 454. A monitor 458 or other type of display device is also connected to the system bus 426 via an interface, such as a video input/output 460. In addition to the monitor, computing environment 420 may include other peripheral output devices (not shown), such as speakers or other audible output.

The computing environment 420 may communicate with other electronic devices such as a computer, telephone (wired or wireless), personal digital assistant, television, or the like. To communicate, the computer environment 420 may operate in a networked environment using connections to one or more electronic devices. FIG. 12 depicts the computer environment networked with remote computer 462. The remote computer 462 may be another computing environment such as a server, a router, a network PC, a peer device or other common network node, and may include many or all of the elements described above relative to the computing environment 420. The logical connections depicted in FIG. 12 include a local area network (LAN) 464 and a wide area network (WAN) 466. Such networking environments are commonplace in offices, enterprise-wide computer networks, intranets and the Internet.

When used in a LAN networking environment, the computing environment 420 may be connected to the LAN 464 through a network I/O 468. When used in a WAN networking environment, the computing environment 420 may include a modem 470 or other means for establishing communications over the WAN 466. The modem 470, which may be internal or external to computing environment 420, is connected to the system bus 426 via the serial port interface 452. In a networked environment, program modules depicted relative to the computing environment 420, or portions thereof, may be stored in a remote memory storage device resident on or accessible to remote computer 462. Furthermore other data relevant to the application of for executing services accessible over a plurality of different access channels method (described in more detail further above) may be resident on or accessible via the remote computer 462. The data may be stored for example in an object or a relation database. It will be appreciated that the network connections shown are exemplary and other means of establishing a communications link between the electronic devices may be used.

The above-described computing system is only one example of the type of computing system that may be used to implement the method for executing services accessible over a plurality of different access channels.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An Internet protocol multimedia subsystem (IMS) application server, accessible over multiple different access channels, comprising:
  a data layer comprising a repository configured to store information associated with multiple existing hosted services that are accessible through multiple different protocols and multiple different physical connections;
  a service creation layer comprising multiple different service creation environments, each of the multiple service creation environments associated with a different node library customized to a different external client and providing a drag-and-drop functionality, wherein the service creation layer is operable to:
    receive input at a first service creation environment of the multiple service creation environments;
    create a new hosted service in response to the input received at the first service creation environment, wherein the new hosted service is customized to a first external client associated with a second service creation environment that sent the input received at the first service creation environment, and wherein the new hosted service is accessible from the multiple different protocols and the multiple different physical connections;
    test the new hosted service; and
    provide the new hosted service to a service execution layer comprising:
  service logic circuitry comprising:
    deployment management circuitry configured to deploy and remove the existing hosted services and the new hosted service;
    a building block library configured to execute the existing hosted services and the new hosted service;
    rule engine circuitry comprises rules defining execution of the existing hosted services and the new hosted service;
    session management circuitry configured to enterprise-to-enterprise sessions during execution of the existing hosted services and of the new hosted service; and
    monitoring management circuitry configured to provide server fault and performance data to an external server; and
  communication circuitry operable to connect to an external service provided by other network nodes involved in executing the multiple existing hosted services, the new hosted service, or both, the communication circuitry comprising:

a first adapter configured to provide hypertext transfer protocol (http) communication with the external clients;
a second adapter configured to provide session initiation protocol (SIP) communication; and
a third adapter configured to provide simple network management protocol (SNMP) communication.

2. The IMS application server of claim 1, wherein the IMS application server is located in a service layer of an IMS network.

3. The IMS application server of claim 1, wherein the service logic circuitry is further operable to interact with the service creation layer for creating a first hosted service and at least one of deploying or undeploying the first hosted service for communication through the communication circuitry.

4. The IMS application server of claim 1, wherein a first hosted service of the multiple existing hosted services is an Internet Protocol (IP) contact center service.

5. The IMS application server of claim 1, wherein the new hosted service comprises an internet protocol television service.

6. The IMS application server of claim 1, wherein the first service creation environment comprises a different service creation environment from the second service creation environment.

7. The IMS application server of claim 1, wherein the new hosted service comprises a self-activated service.

8. The IMS application server of claim 1, further comprising transport layer circuitry configured to support an internet protocol layer allowing transport over multiple network types.

9. A method, comprising:
at an internet protocol multimedia subsystem (IMS) application server:
providing a set of existing hosted services that are accessible from multiple different protocols and multiple different physical connections;
providing multiple different service creation environments, each service creation environment being associated with a different node library customized to a different external client and provides a drag-and-drop functionality;
receiving input at one or more of the service creation environments;
creating a new hosted service in response to input received at a first service creation environment, wherein the new hosted service is customized to an external client associated with a second service creation environment that sent the input that was received by the first service creation environment, and wherein the new hosted service is accessible from the multiple different protocols and the multiple different physical connections;
testing the new hosted service;
deploying the new hosted service into a service execution layer of the IMS application server;
receiving a request from a user for a first hosted service of the hosted services in the set of existing hosted services or for the new hosted service over at least one of the multiple different protocols and the multiple different physical connections at the IMS application server;
retrieving a user profile corresponding to the user;
executing the first hosted service, wherein the execution is automatically adapted according to the user profile; and
connecting to an external service provided by other network nodes involved in executing the set of existing hosted services or the new hosted service.

10. The method of claim 9, wherein the IMS application server is located in a service layer of an IMS network.

11. The method of claim 9, wherein the first hosted service is an Internet Protocol (IP) contact center service.

12. The method of claim 9, wherein the user profile comprises a dynamic user profile that specifies interest in the first hosted service.

13. The method of claim 12, wherein the dynamic user profile specifies interest in the first hosted service by indicating a subscription to the first hosted service.

14. The method of claim 9, wherein receiving a request from a user comprising receiving a request from a home subscriber server of a public land mobile network that hosts a mobile device of the user.

15. A product comprising:
a machine-readable medium other than a transitory signal; and
computer-readable instructions stored on the machine-readable medium that, when executed, cause a processor to:
provide a set of existing hosted services that are accessible from multiple different protocols and multiple different physical connections;
provide multiple different service creation environments, each service creation environment being associated with a different node library customized to a different external client and provides a drag-and-drop functionality;
receive input at a first service creation environment of the service creation environments;
create a new hosted service in response to input received at the first service creation environment, wherein the new hosted service is customized to an external client associated with a second service creation environment that sent the input received at the first service creation environment, and wherein the new hosted service is accessible from the multiple different protocols and the multiple different physical connections;
test the new hosted service;
deploy the new hosted service into a service execution layer of an Internet protocol multimedia subsystem (IMS) application server;
receive a request from a user for a first hosted service of the hosted services in the set of existing hosted services or the new hosted service over at least one of the multiple different protocols and the multiple different physical connections at the IMS application server;
retrieve a user profile corresponding to the user;
execute the first hosted service, wherein the instructions are configured to automatically adapt the execution according to the user profile; and
connect to an external service provided by other network nodes involved in executing the set of existing hosted services or the new service.

16. The product of claim 15, wherein the IMS application server is located in a service layer of an IMS network.

17. The product of claim 15, wherein the first hosted service is an Internet Protocol (IP) contact center service.

18. The product of claim 15, wherein the user profile comprises a dynamic user profile that specifies interest in the first hosted service.

19. The product of claim 18, wherein the instructions are configured to automatically adapt the execution by adapting to user interactions stored in the dynamic user profile.

20. The product of claim 15, wherein the instructions are further configured to support an internet protocol layer allowing transport over multiple network types.

* * * * *